United States Patent
Hsu

(10) Patent No.: US 8,584,524 B2
(45) Date of Patent: Nov. 19, 2013

(54) NANO-RESONATOR INERTIAL SENSOR ASSEMBLY

(75) Inventor: Ying Hsu, San Clemente, CA (US)

(73) Assignee: ISC8 Inc., Costa Mesa, CA (US)

( * ) Notice: Subject to any disclaimer, the term of this patent is extended or adjusted under 35 U.S.C. 154(b) by 0 days.

(21) Appl. No.: 13/324,573

(22) Filed: Dec. 13, 2011

(65) Prior Publication Data

US 2013/0019682 A1 Jan. 24, 2013

Related U.S. Application Data

(63) Continuation-in-part of application No. 12/581,003, filed on Oct. 16, 2009, now Pat. No. 8,443,665, and a continuation-in-part of application No. 12/806,339, filed on Aug. 9, 2010, now Pat. No. 8,327,705.

(60) Provisional application No. 61/459,441, filed on Dec. 13, 2010, provisional application No. 61/196,689, filed on Oct. 21, 2008, provisional application No. 61/273,844, filed on Aug. 10, 2009.

(51) Int. Cl.
*G01P 15/10* (2006.01)

(52) U.S. Cl.
USPC .................................. 73/514.29; 73/514.38

(58) Field of Classification Search
USPC ................ 73/514.29, 514.16, 514.38, 514.36
See application file for complete search history.

(56) References Cited

U.S. PATENT DOCUMENTS

| 5,594,170 A * | 1/1997 | Peters ........................ 73/514.29 |
| 6,386,035 B2 * | 5/2002 | Janiaud et al. ............ 73/514.29 |
| 6,389,898 B1 * | 5/2002 | Seidel et al. ............... 73/514.29 |
| 6,722,200 B2 * | 4/2004 | Roukes et al. .................. 73/580 |
| 6,904,803 B2 * | 6/2005 | Baudry et al. ............. 73/514.29 |
| 7,104,128 B2 * | 9/2006 | Inglese et al. ............. 73/514.01 |
| 7,726,189 B2 * | 6/2010 | Vyas et al. ...................... 73/580 |
| 7,824,098 B2 * | 11/2010 | Melamud et al. ............ 374/117 |
| 8,136,401 B2 * | 3/2012 | Hentz et al. ................ 73/514.29 |
| 2006/0032306 A1 * | 2/2006 | Robert ........................ 73/504.02 |
| 2008/0297276 A1 * | 12/2008 | Jun et al. ........................ 333/186 |
| 2009/0083011 A1 * | 3/2009 | Hao .................................. 703/2 |

* cited by examiner

*Primary Examiner* — Helen Kwok
(74) *Attorney, Agent, or Firm* — W. Eric Boyd, Esq.

(57) ABSTRACT

The invention is a frequency modulated (FM) inertial sensing device and method which, in one embodiment, comprises an accelerometer having a proof mass coupled to a nano-resonator element. The nano-resonator element is oscillated at a first predetermined frequency, which may be a first resonant frequency, and is altered to oscillate at a second frequency, which may be a second resonant frequency, in response to a resultant force produced by the acceleration of the proof mass. The degree of change in nano-resonator element output frequency is sensed and processed using suitable processing circuitry as a change in acceleration.

6 Claims, 6 Drawing Sheets

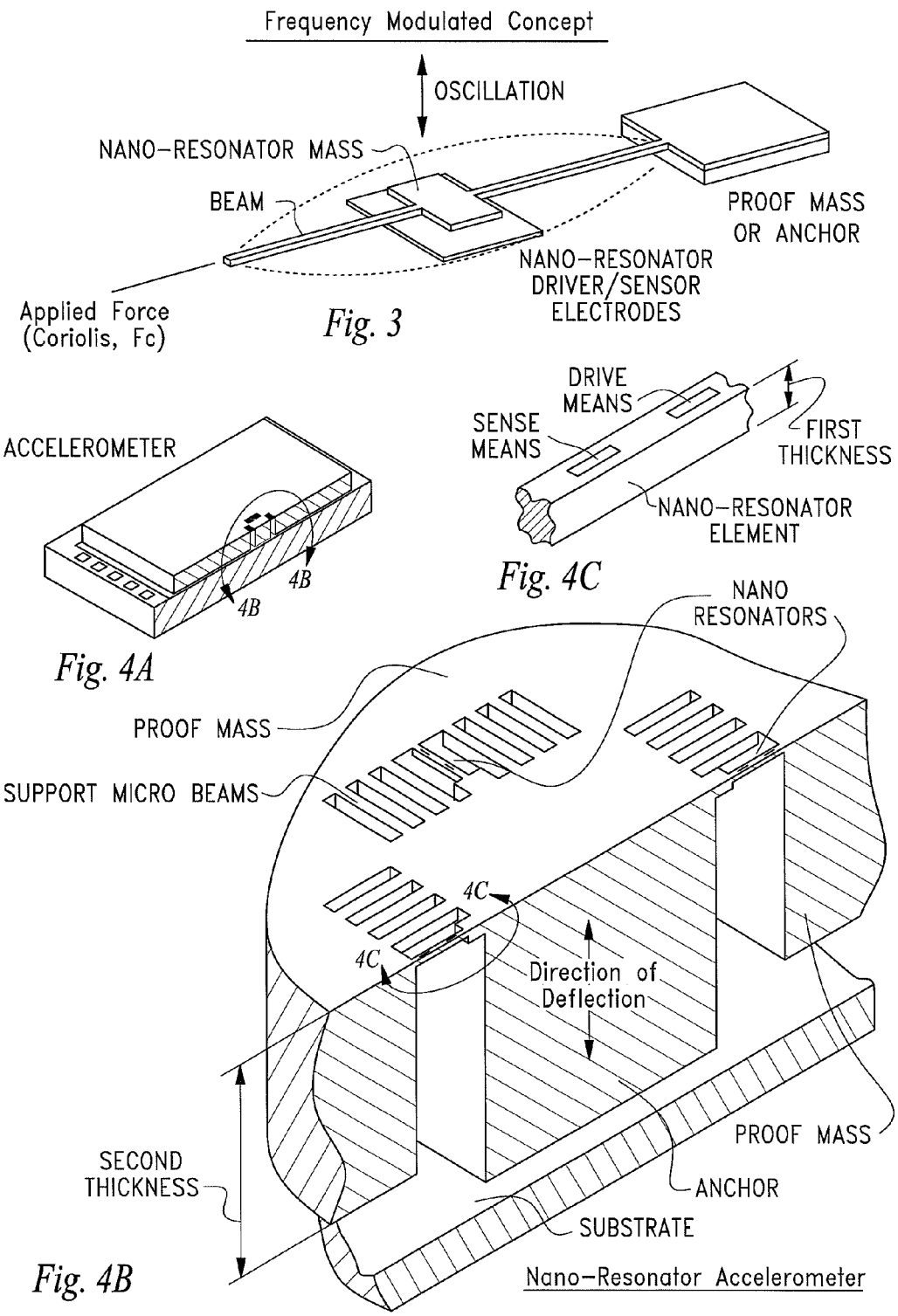

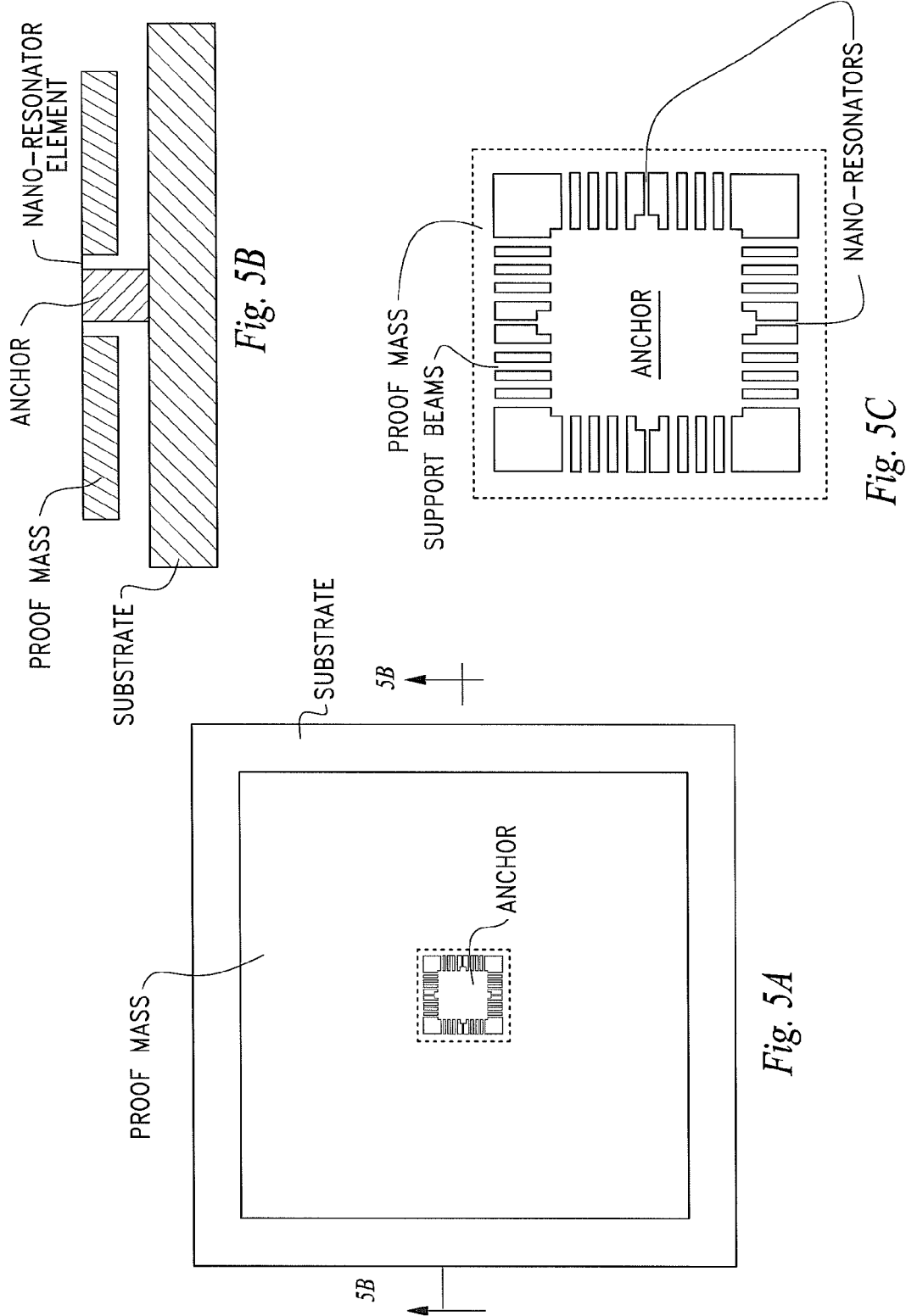

NANO-RESONATOR INERTIAL SENSOR ASSEMBLY

CROSS-REFERENCE TO RELATED APPLICATIONS

This application claims the benefit of U.S. Provisional Patent Application No. 61/459,441, filed on Dec. 13, 2010 and entitled "Nano-Resonator Inertial Sensor Assembly (NRISA)" pursuant to 35 USC 119, which application is incorporated fully herein by reference.

This application is a continuation-in-part application of U.S. patent application Ser. No. 12/581,003, now published as U.S. Pub. No. US2010/0095770 and entitled "Frequency Modulated Micro Gyro", filed on Oct. 16, 2009 now U.S. Pat. No. 8,443,665, which in turn claims priority U.S. Provisional Patent Application No. 61/196,689, entitled "Frequency Modulated Micro Gyro" filed on Sep. 21, 2008, pursuant to 35 USC 119, which applications are incorporated fully herein by reference.

This application is a continuation-in-part of U.S. patent application Ser. No. 12/806,339, filed on Aug. 9, 2010 now U.S. Pat. No. 8,327,705 and entitled "Frequency Modulated Micro-gyro Signal Processing Method and Device" which in turn claims the benefit of U.S. Provisional Patent Application No. 61/273,844, filed on Aug. 10, 2009, entitled "Frequency Modulated Gyro" pursuant to 35 USC 119, which applications are incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of inertial measurement and accelerometer devices.

More specifically, the invention relates to an inertial sensor that employs a nano-resonator transduction mechanism that produces, in its native form, a high frequency output signal (MHz) and whose change in output frequency is proportional to change in angular rate in a micro-gyroscope or linear acceleration in an accelerometer.

2. Description of the Prior Art

Military applications have a need for low power, micro-scale inertial sensor technology for applications in guidance and control of precision munitions.

Existing inertial rotation and acceleration sensors face a number of challenges to mass fielding. These challenges include high unit cost, low survival rate in high-G firing acceleration, reliance on the GPS to achieve accuracy and large volume power sources. To overcome these challenges, an objective is to develop an accurate inertial sensor that achieves required accuracy without the use of GPS, that it be produced at low cost (<$1000), that it operate using low power (<4 Watts), that it survive high acceleration (20,000 G), and that it be suitable for integration into munitions in mass production.

Micro-inertial sensors such as those made using micro-electro-mechanical systems ("MEMS") technology have been widely used in a broad spectrum of applications due to the advantages of small size, low weight, low power, and batch semiconductor processing steps.

On one end of the spectrum, lower performance MEMS and quartz-based micro-gyros and accelerometers are produced in quantities of millions per month at a unit cost of less than about $10.00 for automotive control applications and less than about $2.00 for consumer electronics applications.

On the other end of the spectrum are the high-performance MUMS sensors produced for aerospace and military applications, which are very expensive and produced only in small quantities. While high performance MEMS inertial sensors provide unique capabilities to meet the stringent requirements of precision munitions, the low production volume (projected to be about 200,000 units over the next five years) presents a major challenge for sensor manufacturers, even at a unit cost of $1,000.

To address the issues of cost, sensitivity, power, and high acceleration, Applicant discloses a solution to the above deficiencies in the prior art which in, one embodiment, takes advantage of chip-scale integration that integrates six inertial sensors (three micro-gyroscopes for X-Y-Z axes of rotation and three accelerometers for X-Y-Z axes of acceleration) offering a three-axis rotation and acceleration measurement solution for meeting high performance applications such as military requirements for next generation precision munitions.

BRIEF SUMMARY OF THE INVENTION

The invention comprises a frequency modulated (FM) inertial sensing device and method which, in one embodiment, comprises an accelerometer having a proof mass coupled to a nano-resonator element. The nano-resonator element is oscillated at a first predetermined frequency, which may be a first resonant frequency, and is altered to oscillate at a second frequency, which may be a second resonant frequency, in response to a resultant force produced by the acceleration of the proof mass.

The degree of change in nano-resonator element output frequency is sensed and processed using suitable processing circuitry as a change in acceleration.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE SEVERAL VIEWS OF THE DRAWINGS

FIG. 3 illustrates a nano-resonator frequency modulation concept.

FIGS. 4A-C depict a preferred embodiment of the nano-resonator accelerometer of the invention.

FIGS. 5A-C illustrate different views of a preferred embodiment of the nano-resonator accelerometer of the invention.

The invention and its various embodiments can now be better understood by turning to the following detailed description of the preferred embodiments which are presented as illustrated examples of the invention defined in the claims.

It is expressly understood that the invention as defined by the claims may be broader than the illustrated embodiments described below.

DETAILED DESCRIPTION OF THE INVENTION

Turning now to the figures wherein like references define like elements among the several views, Applicant discloses an inertial sensor and process for measuring an inertial force such as rotation or acceleration that employs a nano-resonator transduction mechanism that produces, in its native form, a high frequency signal (MHz) and whose change in frequency is proportional to change in angular rate (gyroscope) or linear acceleration (accelerometer).

In a preferred embodiment, the invention may comprise a plurality of inertial sensors, e.g., six inertial sensors (three gyroscopes and three accelerometers fir each of X-Y-Z axes) on a single integrated circuit chip having dedicated processing circuitry which may be in the form of a field programmable gate array with support circuitry.

A novel feature of invention is that all six sensors produce intrinsic digital outputs. Each sensor employs a unique nano-resonator transduction mechanism that produces, in its native form, a high frequency signal (MHz) whose change in frequency is proportional to change in angular rate (gyroscope) or linear acceleration (accelerometer).

Figure 1:
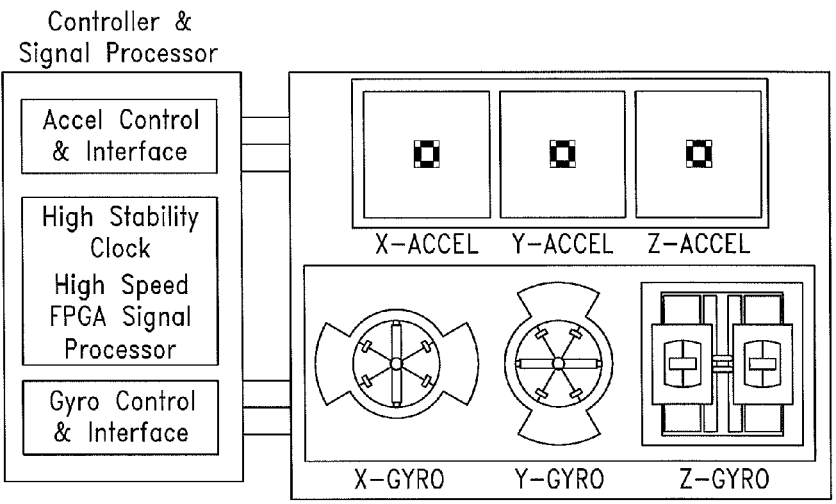
FIG. 1 depicts a preferred embodiment of a six-axis nano-resonator sensor of the invention.

FIG. 1 depicts a preferred block diagram embodiment of a six-axis nano-resonator sensor of the invention illustrating three accelerometers and three micro-gym structures with related control electronics in a chip scale package.

Prior art MEMS inertial sensors are typically designed to generate output signals whose amplitude provides a measure of angular rate or acceleration. For example, in a typical micro-gyroscope, an element (proof-mass) is driven to vibrate or oscillate at its resonant frequency about a drive axis. A prior art example of such a vibratory device is U.S. Pat. No. 5,955,668 entitled "Multi-Element Micro Gyro", issued to Hsu, et al, on Sep. 21, 1999.

When the oscillating element of a prior art amplitude-based inertial measurement device is subjected to an angular velocity about the rate axis, a Coriolis force is generated about the sense axis; all three axes being orthogonal to each other. The resulting Coriolis force has a magnitude that is proportional to the product of the oscillator's proof mass, velocity, and input angular rate.

All vibratory gyroscopes basically rely on this same Coriolis principle for sensing the angular rate. Unfortunately, in prior art amplitude modulated micro-gyroscopes, the Coriolis force is extremely small (in the range of pico-Newtons) and this Coriolis force is determined by measuring the micro-motion of the proof-mass about the sense axis. At very low angular rates, the movement of the element is only about the size of an atom, making measurement difficult and prone to environmentally induced error and noise.

The Coriolis motion may be detected by measuring very small changes in capacitance using analog readout circuits. The output of the capacitance readout circuit is thus a signal that is proportional to the amplitude of the input angular rate.

Accordingly, these prior art devices have output signals are amplitude-modulated (AM) by the rate.

In contrast to the prior art amplitude-based gyroscopes above, an alternative micro-gyroscope comprises an assembly with an output signal that is frequency-modulated (FM) by the input angular rate. An example of such an FM modulated inertial measurement device is disclosed in U.S. patent application Ser. No. 12/581,003, now published as U.S. Pub. No. US2010/0095770 entitled "Frequency Modulated Micro Gyro", and filed by Applicant of the instant application, the entirety of which is incorporated herein by reference.

The FM micro-gyroscope above may generally comprise a pair of driven nano-resonator elements, (also referred to as "oscillating elements") which may be a few hundred nanometers thick and that are coupled to a proof-mass such that the movement of the proof-mass along the sense direction induces a tension or compression on the oscillating nano-resonator bodies themselves. The resulting physical change in the nano-resonator element structures produces a corresponding change in the nano-resonators' resonant frequency.

The magnitude of frequency change in this embodiment due to the angular rate (also referred to as scale factor) can be large. For example, if an FM micro-gyro comprises a nano-resonator resonating at 2 MHz; the achievable scale factor is about 10 KHz/deg/sec of rate. Because the FM micro-gyroscope nano-resonator output is in the form of a high frequency electronic signal, it is nearly immune to electronic cross-talk and electromagnetic interference.

Similarly, the digital nature of the nano-resonator output signal of an FM micro-gyroscope lends itself to signal processing with a high degree of accuracy. Suitable signal processing architecture in this form of device can achieve a frequency resolution of about 1:10 million to about 1:100 million using field programmable gate array devices ("FPGA"s) and may exceed 1:1 billion with the use of dedicated high speed application specific integrated circuits ("ASIC"s).

In addition to one or more FM micro-gyros, a preferred embodiment of the invention may employ one or more nano-resonator accelerometers on the chip. Similar to an FM micro-gyroscope, the nano-resonator accelerometer comprises a proof-mass that: is used to generate tensile or compressive forces on one or more nano-resonator elements in response to acceleration.

An acceleration or deceleration of the proof mass will induce a force that produces a tension or compression in the physical structure the nano-resonator elements. With appropriate drive oscillation and modulation of the proof-mass, the output signal from a nano-resonator accelerometer appears similar to the output signal from an FM micro-gyro and, as such, a single signal processor circuitry may be used to process all six micro-sensor outputs.

The nano-resonator accelerometer of the invention provides many important advantages as compared to prior art micro-gyroscopes and accelerometers that operate based on amplitude modulation. Without limitation, these advantages include:

Low noise, high resolution sensors: A high performance AM micro-gyroscope can achieve a noise performance of about 0.1 deg/rthr (Angle Random Walk). The noise sources in AM micro-gyroscopes are numerous including amplifier noise, voltage reference noise, and resistor noise. Despite the best filtering and demodulation techniques, a significant amount of noise still passes through, thus limiting resolution. The invention of the disclosure provides an improvement of up to two orders of magnitude over prior art AM micro-gyroscopes.

High bias and temperature stability: The stability of micro-inertial sensors is largely attributable to sensor design and stability of processing electronics over the range of operating temperatures. The nano-resonator accelerometer of the invention desirably employs a single-anchor design which virtually eliminates stresses due to packaging and expansion of dissimilar materials. The repeatability of Applicant's gyroscope devices has been measured to reach about 300 ppm over the temperature range of about −45 to about +80° C. using analog electronics and a structure made of poly-silicon. By using digital electronics and single crystal silicon for the structure, orders of magnitude improvement in bias stability with nano-resonator sensors are achievable.

Chip-scale integration: The digital nature of the nano-resonator sensors of the invention makes it significantly easier to integrate multiple sensors on a single integrated chip using well-defined semiconductor processes. Prior art micro-inertial sensors suffered from not only low performance due to noise from the sensor and readout electronics, but also from cross-talk and interference signals when multiple sensors were integrated. Since each nano-resonator of the invention may have a different resonant frequency clue to manufacturing imperfection, the digital processor very easily discriminates and filters unwanted signals.

The instant invention provides a high performance inertial measurement unit with at least the following benefits:

High sensitivity, GPS-independent operation: A nano-resonator based micro-gyro having gyro-compassing applications and targeting bias stability of 0.01 deg/hr; representing two orders of magnitude higher than, for instance, a prior art MEMS IMU developed by Honeywell's Deep Integrated Guidance and Navigation Unit (DIGNU).

The resonator-based accelerometer of the invention achieves a bias stability of several micro-Gs and a scale factor error of a few ppm; about two orders of magnitude higher than DIGNU. The nano-resonator accelerometer herein offers the potential for meeting the military's requirement for future precision munitions.

Low power operation: The nano-resonator accelerometers may take advantage of the ability for integration of multiple digital sensors to reduce power consumption by using shared components such as a common voltage source and precision reference clock, and better utilization of the FPGA resources. Chip-scale integration results in a compact electronics system with shorter signal paths and fewer drivers.

Resistance to high G-forces: The nano-resonator sensors of the invention desirably retain robust characteristics of MEMS sensors due to their micro-scale size. With fewer number components and sub-assemblies, the nano-resonator accelerometer has fewer interconnections which are prone to failure when subject to high acceleration forces. The resulting miniature system package is capable of withstanding high-G munitions firing accelerations better than larger IMU assemblies.

Low unit fabrication cost: Other than production volume, packaging and testing tends to have the largest effect on sensor fabrication cost. Packaging and testing costs may represent about 70-80% of the cost of MEMS sensors. The single-chip solution of the nano-resonator accelerometer herein reduces the packaging and integration of six separate sensors to a single sensor. System packaging costs are thus significantly lower with a smaller number of parts and assemblies. Testing of multi-axis sensors is more complicated than testing a single-axis sensor, but with appropriate testing strategies, self-test capabilities in the devices are possible to eliminate or minimize intermediate testing.

Built-in self-calibration of high performance inertial sensors is an area of interest in the military and effective on-chip calibration technologies are emerging. The number of die yielded per wafer may be lower for a chip with six devices as compared to fewer individual devices; however, with advances in MEMS processes, yields of nearly 99% are not uncommon today.

As background to the nano-resonator sensor device of the invention, the FM micro-gyroscope operation is first briefly discussed and nano-resonator accelerometer operation is discussed thereafter.

Figure 2:
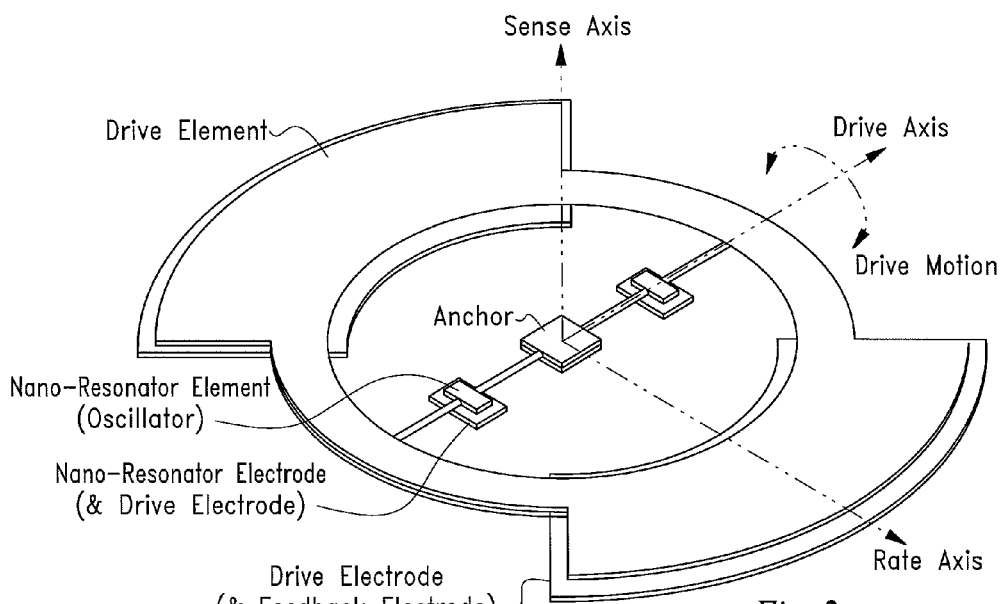
FIG. 2 is a prior art frequency modulated micro-gyro.

FIG. 2 generally illustrates the prior FM micro-gyroscope and its concept of operation as is more fully described in the above-cited U.S. Pat. No. 5,955,668 entitled "Multi-Element Micro Gyro", issued to Hsu, et al, on Sep. 21, 1999.

As indicated above, prior art micro-gyroscopes typically consist of a proof-mass (also referred to as a "drive element") that is supported on spring-like structures and is suspended above a substrate. The drive element is excited into oscillation by electrostatic force such as by the use of electrostatic comb drive elements. With the element connected to an electrical ground, and by applying alternating voltages to the electrodes, the induced electrostatic forces induced cause the drive element to oscillate angularly about the drive axis. This oscillation is typically in the range of about a few thousands of Hz.

In the nano-resonator accelerometer of the invention, in order to distinguish the output oscillation of the nano-resonator element from its drive oscillation, the sense oscillation is preferably designed to be as high as possible, i.e., in the MHz range. High frequency is also desirable to yield the largest change in resonant frequency per unit change of nano-resonator length.

The approach Applicant has conceived is similar to the phenomenon observed in tuning a guitar string. FIG. 3 illustrates a general concept of converting the Coriolis force into a shift in the resonant frequency of a nano-resonator element in an FM micro-gyro. The nano-resonator sense element resonant frequency is determined by the mass of the nano-resonator element and the stiffness of the support beams.

A Coriolis force is applied to one end of the beam, with the other end of the beam connected to a stationary post, anchor or proof mass. The resultant change in the tension or compression of the beam causes a shift in the resonant frequency of the oscillation of the nano-resonator body, in the same manner that increasing or decreasing tension on a guitar string would change the resonant frequency of the string, which can be heard when the string is plucked.

The unique benefit of the disclosed nano-resonator transducer element is that the output signal of the nano-resonator sense means (which may be a capacitive sensor) is naturally in digital form. As a result, the resonant frequency of the nano-resonator elements are readily measured using circuitry that detects zero-crossing and converts the output to a square wave.

Since the nano-resonator elements of the invention are driven to operate at relatively high frequencies (MHz), the output signal is distinct and not easily corrupted or distorted by noise sources. A further benefit of using nano-resonator elements is that precise thermal management of the sensor is relatively simple, given the entire sensor may be provided in a chip-scale package only a few millimeters in size.

Controlling the temperature of any analog electronic circuitry to a few mili-degrees Celsius is a consideration due to heat sources in electronics and should be considered in the design of the assembly of the invention. For very high temperature tracking, a method called "dual-mode resonator" has been shown to be highly effective in high accuracy frequency tracking of resonators used in precision clocks and frequency counters. Using digital signal processing and measuring frequency shifts achieves resolutions that are several orders of magnitude higher than measuring amplitudes using analog electronics.

The fabrication of the FM inertial sensor of the invention may be based on established MEMS foundry and design processes. In one embodiment of a MEMS process of the invention, a multi-layer MEMS process is used to deposit and selectively etch a substrate in order to produce nano-resonator drive electrodes and the nano-resonator element vibration structure. Silicon-on-Insulator ("SOI") processes may also be used. During processing, the structure is supported on a layer of sacrificial material that is removed in a subsequent processing step, leaving the structure suspended and supported on the anchor as illustrated in FIG. 3, 4A-C and 5B. The structure is fabricated from single crystal silicon and the electrode is doped poly-silicon or aluminum.

Deep reactive ion etching (DRIE) is a standard MEMS process capable of making structures with fine features (<1 microns) and high aspect ratios (>20). For the starting wafer, using Silicon-On-Insulator (SOI) provides a simple way to control the thickness of the nano-resonators.

The actuation (i.e., "drive means") and detection (i.e., sensing means") of nano-resonator motion for the FM inertial sensor may be accomplished by using electrostatic drive charges. For actuation, electrostatic drive means and piezoelectric drive means may be used in the invention and have proven to be very effective in generating sufficient force to oscillate micro-structures such as the nano-resonator elements of the invention. For motion or sensing detection, capacitive sensing techniques such as have been adopted in prior art AM micro-gyros have proven to be precise and low-power.

Multiple FM micro-gyroscopes and nano-resonator accelerometers may be fabricated on a single wafer. After the final release of the structure, the wafer may be capped with a silicon wafer in a vacuum, and each device individually sealed. Prior experience of the Applicant has shown that 10 to 100 mTorr is easily achievable with wafer level bonding, and that level of vacuum is adequate to achieve high mechanical amplification.

The nano-resonator accelerometer invention may follow a similar design approach as the FM micro-gyroscope described above.

In a nano-resonator accelerometer of the invention, a proof-mass is suspended and supported over a substrate by means of a central anchor using, for instance, a plurality of micro-scale support beams coupled to anchor and to the proof-mass. The micro-scale support beams are connected to the proof-mass on one end and to a stationary post or anchor on the opposing end. The micro-scale beams may have a predetermined stiffness. The micro-scale support beams are preferably designed to ensure that the proof-mass will be compliant along a specific direction for which the acceleration is to be measured, and relatively stiff in the other orthogonal directions.

A set of nano-resonator elements with nano-scale thicknesses (typically a few hundred nanometers thick) are provided and are coupled to the proof-mass and the anchor. The nano-resonator elements comprise electrodes that permit them to be excited (i.e., driven) and sustained at a predetermined frequency which may be their resonant frequency. As with the FM micro-gyroscope, movement of proof-mass resulting from acceleration causes the nano-resonator elements to change their length and tension or compression, thereby changing their resonant frequency.

The table below sets forth a summary of certain specifications of the key figures of merit for a preferred embodiment of a nano-resonator device of the invention.

TABLE 1

| Parameter | |
|---|---|
| Operating Acceleration | 30 G |
| Bias Stability | 1 micro-G |
| Scale Factor Error | 10 ppm |
| Transduction Scale Factor | 10 KHz/G |
| Maximum Chip Size | 3 mm × 3 mm |

FIGS. 4A-C and 5A-C illustrate different views of a preferred embodiment of the nano-resonator accelerometer device of the invention.

In a first preferred embodiment, the inertial sensor comprises a proof mass coupled to a nano-resonator element with the nano-resonator element being oscillated at a first predetermined frequency and is altered to oscillate at a second frequency in response to a resultant force produced by the inertia, rotation or acceleration of the proof mass.

In a second preferred embodiment as best illustrated in FIGS. 4-A-C and 5 A-C, the inertial sensor may comprise a centrally disposed anchor coupled to a substrate. A proof mass is provided having a first thickness coupled to the anchor and suspended over the substrate by means of at least one support micro-beam having a predefined stiffness.

A nano-resonator element is provided having a second thickness coupled to the anchor and the proof mass. The invention may further comprise nano-resonator drive means for driving the nano-resonator element at a first predetermined frequency. Nano-resonator drive means may comprise electrostatic drive means, piezoelectric drive means or other drive means suitable for driving the nano-resonator element a first predetermined frequency such as a first resonant frequency.

The first predetermined frequency may comprise a resonant frequency of the nano-resonator element. The invention may further comprise sensing means for detecting the nano-resonator output frequency which sensing means may comprise means for sensing a change in capacitance based on the nano-resonator element position.

In a third preferred embodiment, the first thickness of the proof mass thickness is greater than about ten times that of the thickness of the nano-resonator element.

In a fourth aspect of the invention, the proof mass thickness is greater than about 100 microns and the thickness of the nano-resonator element is less than about one micron.

In a fifth aspect of the invention the sensor further comprises proof mass drive means for oscillating the proof mass at a proof mass frequency and the proof mass and nano-resonator element are coupled whereby the proof mass frequency modulates the nano-resonator output frequency.

In a sixth aspect of the invention, a method for sensing acceleration is provided and may comprising the steps of providing a proof mass coupled to a nano-resonator element, oscillating the nano-resonator element at a first predetermined frequency, detecting the output frequency of the nano-resonator element in response to an acceleration of the proof mass, and, measuring the rate of acceleration based on the shift in frequency from the first predetermined frequency to the output frequency.

In the illustrated embodiments of FIGS. 4A-C and 5A-C, the proof mass may have dimensions of or less than about 2.5 mm in length×about 2.5 mm in width×about 200 µm in thickness. The nano-resonator elements may have dimensions of less than or about 46 µm in length×about 5 µm in width×less than or about 1 µm in thickness.

Figure 6A:
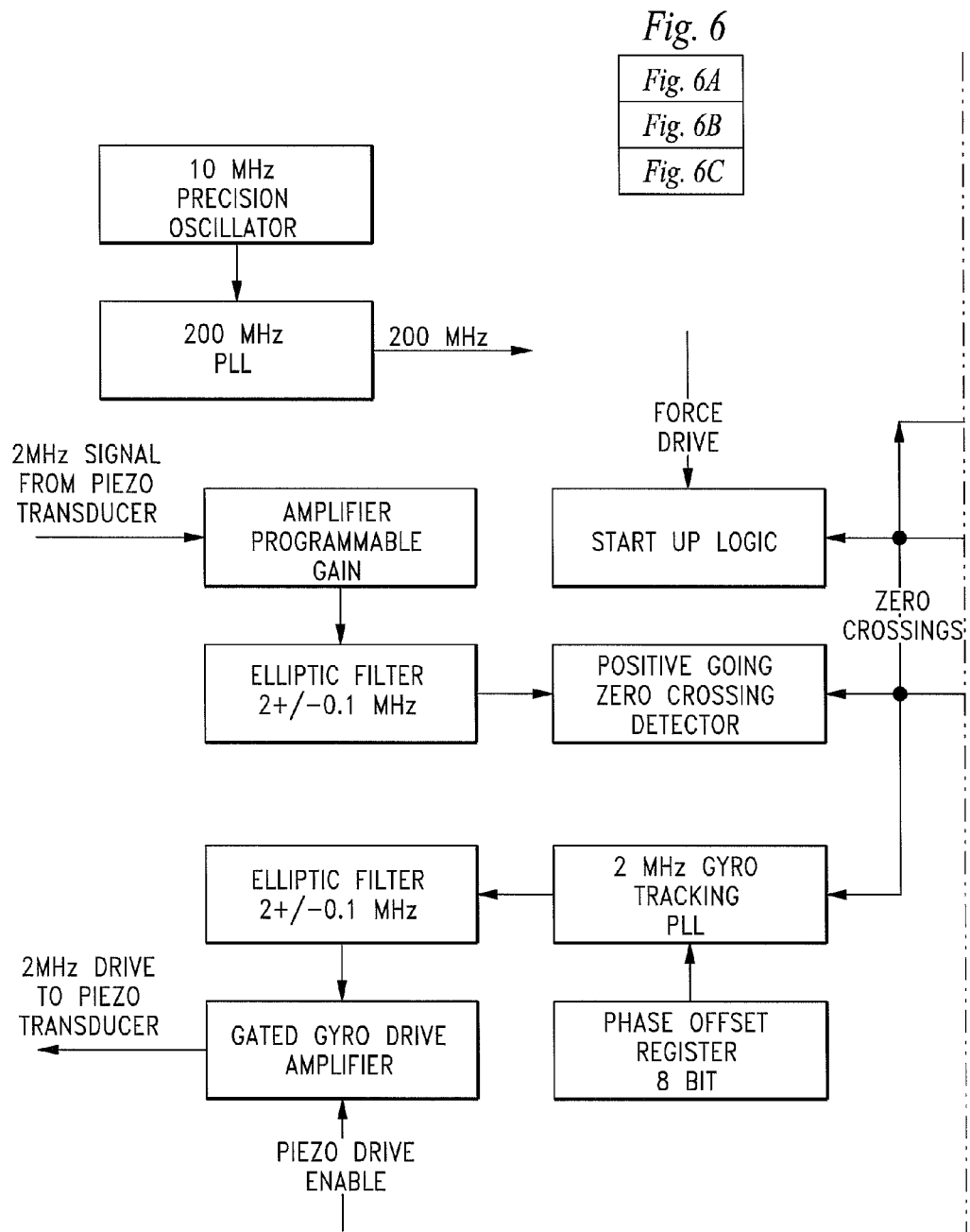
FIG. 6A-C is a block diagram illustration of an exemplar nano-resonator FM signal processing circuit of the invention.
Figure 6B:
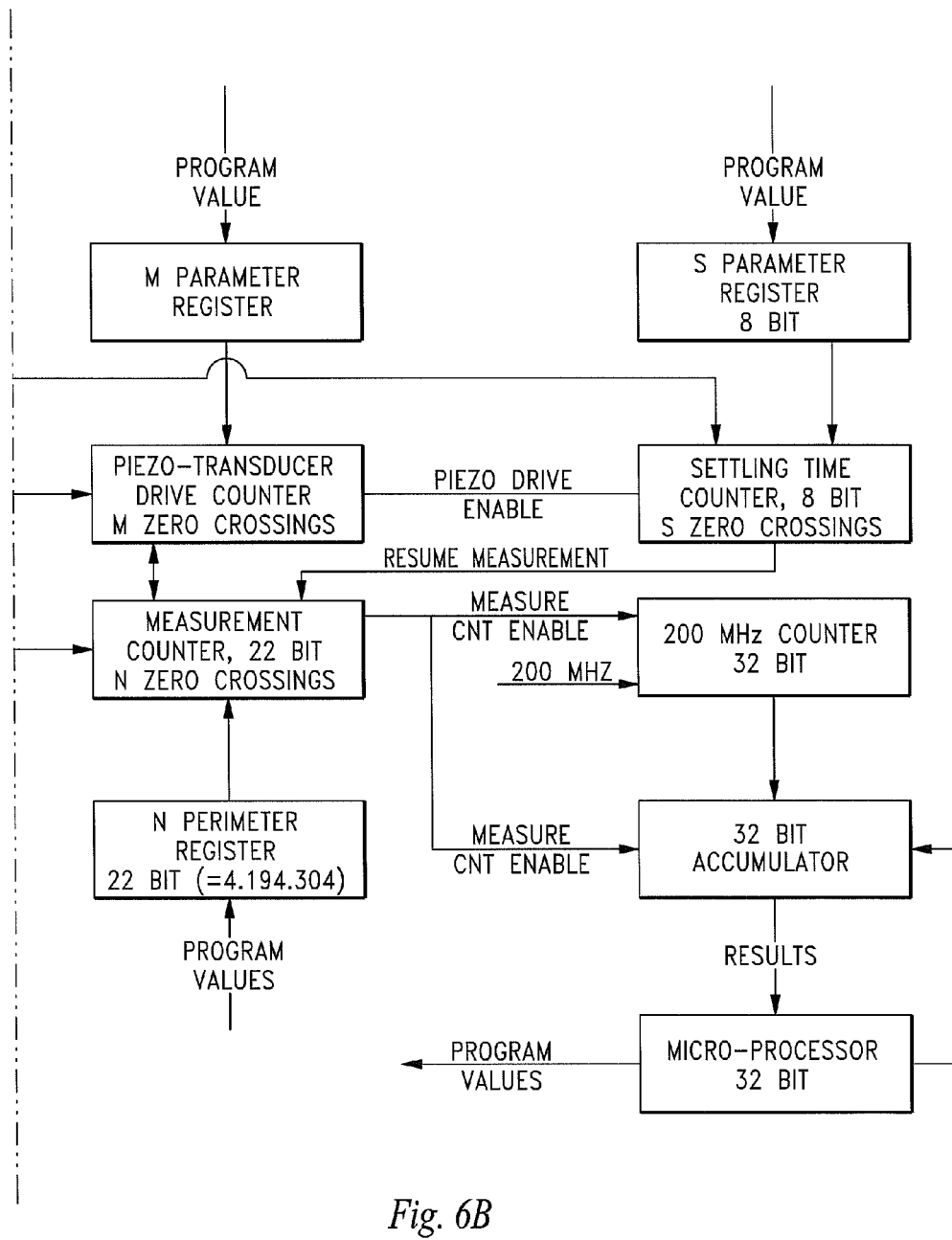
Figure 6C:
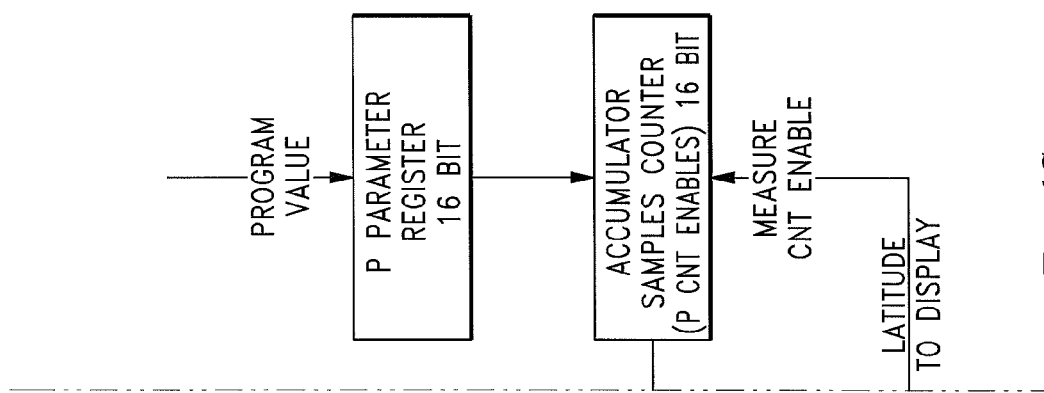

FIG. 6 shows a signal processing circuit block diagram for use in processing the output of the nano-resonator element or FM micro-gyroscope of the invention. Using the disclosed circuitry, a frequency resolution of about 1:20M is achievable using a standard FPGA operating at about 200 MHz. With a higher speed FPGA, the achievable frequency resolution is about 1:200 million. Further increases in resolution, in excess of 1:1 billion are possible using an ASIC incorporating Bi-CMOS technology.

Figure 7:
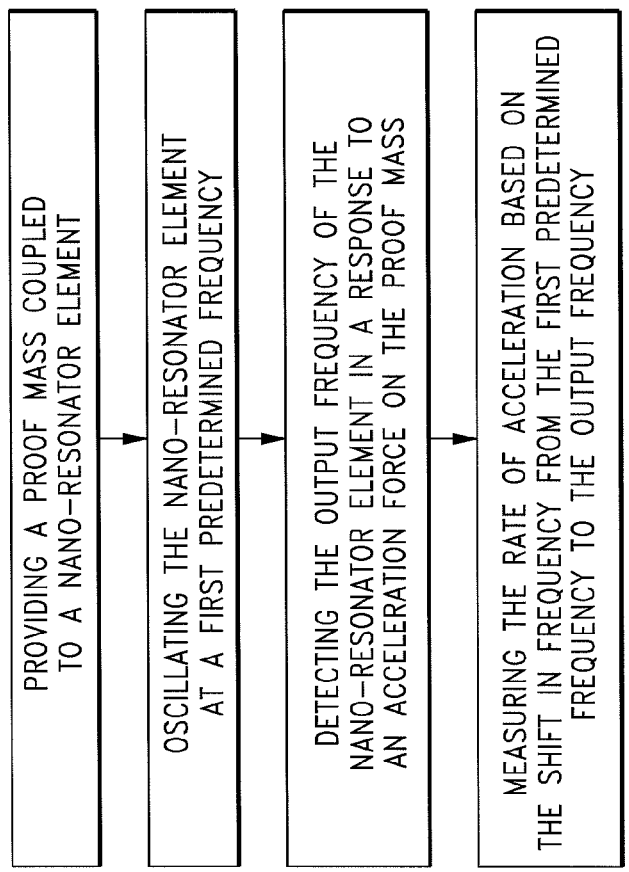
FIG. 7 illustrates a set of process steps of the invention for measuring acceleration.

FIG. 7 is a set of process steps of the invention for measuring acceleration.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. An inertial sensor comprising:
a proof mass suspended on a centrally-disposed anchor by a plurality of micro-beams that are longitudinally disposed orthogonal to a direction of deflection of the sensor,
the proof mass coupled to a plurality of nano-resonators that are longitudinally disposed orthogonal to the direction of deflection,
the nano-resonators comprising a sense means and a drive means disposed on a first thickness of the nano-resonators,
the nano-resonators configured to be capable of being oscillated at a first predetermined frequency and configured to be capable of being altered to oscillate at a second frequency in response to a resultant force produced by an inertia of the proof mass.

2. An inertial sensor comprising:
a centrally-disposed anchor coupled to a substrate,
a proof mass having a second thickness coupled to the anchor and suspended over the substrate by means of at least one micro-beam that is longitudinally disposed orthogonal to a direction of deflection of the sensor,
a plurality of nano-resonators each having a first thickness,
the plurality of nano-resonators coupled to the anchor and to the proof mass,
the nano-resonators longitudinally disposed orthogonal to the direction of deflection,
nano-resonator drive means for driving the nano-resonators at a first predetermined frequency, and,
sensing means for detecting nano-resonator output frequency.

3. The inertial sensor of claim 2 wherein the second thickness is at least about ten times greater than the first thickness.

4. The inertial sensor of claim 2 wherein the second thickness is greater than about 100 microns and the first thickness is less than about one micron.

5. The inertial sensor of claim 2 wherein the sensor further comprises proof mass drive means for oscillating the proof mass at a proof mass frequency,
the proof mass and the nano-resonator element coupled whereby the proof mass frequency modulates the nano-resonator output frequency.

6. A method for sensing acceleration comprising the steps of:
providing a proof mass suspended on a centrally-disposed anchor by a plurality of micro-beams that are longitudinally disposed orthogonal to a direction of deflection of a sensor,
the proof mass coupled to it plurality of nano-resonators that are longitudinally disposed to the direction of deflection,
the nano-resonators comprising a sense means and a drive means,
oscillating the nano-resonator at a first predetermined frequency,
detecting the output frequency of the nano-resonators in response to an acceleration of the proof mass, and,
measuring a rate of acceleration based on a shift in frequency from the first predetermined frequency to the output frequency.

* * * * *